United States Patent
Hanes (10) Patent No.: US 10,637,936 B2
(45) Date of Patent: Apr. 28, 2020

(54) EMBEDDING INFORMATION IN AN AUDIO STREAM FOR CONNECTIVITY

(71) Applicant: Hewlett-Packard Development Company, L.P., Houston, TX (US)

(72) Inventor: David H Hanes, Loveland, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/567,599

(22) PCT Filed: May 15, 2015

(86) PCT No.: PCT/US2015/031039
§ 371 (c)(1),
(2) Date: Oct. 18, 2017

(87) PCT Pub. No.: WO2016/186610
PCT Pub. Date: Nov. 24, 2016

(65) Prior Publication Data
US 2018/0139287 A1    May 17, 2018

(51) Int. Cl.
*H04L 29/08* (2006.01)
*H04N 21/436* (2011.01)
(Continued)

(52) U.S. Cl.
CPC ............ *H04L 67/16* (2013.01); *G10L 19/018* (2013.01); *H04L 12/4625* (2013.01);
(Continued)

(58) Field of Classification Search
CPC ... H04L 67/16; H04L 65/601; H04L 67/2842; H04L 41/042; H04L 41/0806;
(Continued)

(56) References Cited

U.S. PATENT DOCUMENTS 7,940,732 B2    5/2011  Lowry et al.
2002/0029256 A1* 3/2002  Zintel ................. H04L 12/2803
                                                          709/218
(Continued)

FOREIGN PATENT DOCUMENTS

CN      1658566     8/2005
CN    101115124     1/2008
(Continued)

OTHER PUBLICATIONS

Mandrekar, I. et al.; "An Audio Stream Redirector for the Ethernet Speaker"; 2004; 6 pages.
(Continued)

*Primary Examiner* — Ninos Donabed
(74) *Attorney, Agent, or Firm* — Fabian VanCott (57) ABSTRACT

In some examples, a network connected audio system may embed information in an audio stream for connectivity. The network connected audio system may comprise a hardware processor that plays audio files and a network connectivity engine. The network connectivity engine may embed network connection information in the audio stream, transmit the audio stream with the embedded network connection information, receive network connection information from a first device, and connect the first device to the network connected audio system responsive to receiving the network connection information.

20 Claims, 2 Drawing Sheets

(51) Int. Cl.
*H04L 12/46* (2006.01)
*G10L 19/018* (2013.01)
*H04L 29/06* (2006.01)
*H04N 21/235* (2011.01)
*H04N 21/6332* (2011.01)
*H04N 21/81* (2011.01)

(52) U.S. Cl.
CPC ... *H04L 65/1066* (2013.01); *H04N 21/43615* (2013.01); *H04N 21/235* (2013.01); *H04N 21/6332* (2013.01); *H04N 21/8113* (2013.01); *H04R 2420/07* (2013.01)

(58) Field of Classification Search
CPC ....... G10L 15/30; G10L 19/018; G10L 15/32; G06Q 50/01; G06Q 30/0277; H04M 2250/02; G06F 12/08; G06F 15/173; G06F 15/177; G06F 9/4843
See application file for complete search history.

(56) References Cited

U.S. PATENT DOCUMENTS

| | | | | |
|---|---|---|---|---|
| 2002/0035621 | A1* | 3/2002 | Zintel | H04L 12/2805 709/220 |
| 2002/0112058 | A1* | 8/2002 | Weisman | G06F 9/4411 709/227 |
| 2005/0022210 | A1* | 1/2005 | Zintel | H04L 12/2803 719/318 |
| 2005/0210120 | A1* | 9/2005 | Yukie | H04L 67/306 709/217 |
| 2005/0267935 | A1* | 12/2005 | Gandhi | H04L 29/1232 709/203 |
| 2008/0188965 | A1 | 8/2008 | Bruey | |
| 2008/0218581 | A1 | 9/2008 | Tsai | |
| 2010/0088531 | A1* | 4/2010 | Gao | G06F 1/3203 713/323 |
| 2010/0118873 | A1 | 5/2010 | Nakayama et al. | |
| 2010/0275221 | A1* | 10/2010 | DuVall | H04L 29/06027 719/328 |
| 2012/0290689 | A1 | 11/2012 | Beguelin et al. | |
| 2013/0073748 | A1 | 3/2013 | Masuda et al. | |
| 2013/0173794 | A1* | 7/2013 | Agerbak | H04N 21/43615 709/225 |
| 2013/0291035 | A1* | 10/2013 | Jarvis | H04L 65/4084 725/109 |
| 2013/0297727 | A1* | 11/2013 | Levy | H04N 7/17318 709/217 |
| 2014/0298475 | A1* | 10/2014 | Granstrom | G06F 21/60 726/26 |
| 2014/0373123 | A1 | 12/2014 | Kang | |
| 2015/0222601 | A1* | 8/2015 | Metz | H04L 63/04 726/9 |
| 2015/0373382 | A1* | 12/2015 | Schlogl | H04N 21/214 725/30 |
| 2016/0018959 | A1* | 1/2016 | Yamashita | G06F 3/0484 715/716 |
| 2016/0191598 | A1* | 6/2016 | DeFrancesco | G06Q 30/0277 709/219 |
| 2016/0345066 | A1* | 11/2016 | Barker | H04N 21/4788 |

FOREIGN PATENT DOCUMENTS

| | | |
|---|---|---|
| CN | 101827256 | 9/2010 |
| CN | 102568530 | 7/2012 |
| CN | 104115449 | 10/2014 |
| EP | 2624616 | 8/2013 |
| EP | 2863705 | 4/2015 |
| GB | 2500701 A | 10/2013 |

OTHER PUBLICATIONS

Montanino, J.M.; "Awesum: Audio WiFi Embedded Streaming Using Microcontrollers"; May 2012.

* cited by examiner

EMBEDDING INFORMATION IN AN AUDIO STREAM FOR CONNECTIVITY

BACKGROUND

Network connected audio systems may play audio files. The audio files to be played may be received from multiple sources and/or from multiple users. In order to provide audio files to the network connected audio systems, the users may need to be connected to the network connected audio system.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Network connected audio systems may play audio files. Examples of a network connected audio system include a Bluetooth speaker, a WiFi connected speaker, and/or other audio device that receives information via a network and plays audio files. The audio files to be played may be received from multiple sources and/or from multiple users connected to the network. For examples, audio files may be received from local storage on a user's device, from a streaming music provider (e.g., PANDORA®, SPOTIFY®, and/or other streaming music service provider), from a cloud storage associated with a user connected to the network connected audio system, and/or from other sources. Upon receiving audio files, the network connected audio system may manage a queue of audio files to play.

As mentioned above, the network connected audio system may receive audio files across a network from these multiple sources and from multiple users. Each individual user may need to connect to the audio system to play music. This may pose several technical challenges. For example, an individual user may not know how to connect to the network on which the audio system is connected. This issue may be exacerbated if multiple users want to connect at once (e.g., during a party, etc.). Another issue may arise for maintaining security for the network. For example, the owner of the network (and the audio system) may not want a user to be able to connect to the network outside of the user providing audio files across the network.

To address this issue, the network connected audio system may embed information in an audio stream for connectivity. The network connected audio system may comprise, for example, a hardware processor that plays audio files and a network connectivity engine. The network connectivity engine may embed network connection information in the audio stream, transmit the audio stream with the embedded network connection information, receive network connection information from a first device, and connect the first device to the network connected audio system responsive to receiving the network connection information.

The network connection information may comprise, for example, network identification information of the network connected audio system, security information related to the network, error correction information related to the security information and the network identification information, and/or other information related to connecting to the network. In some examples, the network connection information may also comprise a rolling code that may be used for to ensure timeliness of connection of a device to the network connected audio system. The code may be randomly generated or generated based on information related to the current time, the network connected audio system, and/or other factors. In some examples, a first network connection information may be embedded and transmitted in the audio stream during a first predetermined time period and any device that attempts to connect to the network connected audio system may need to provide that first network connection information to connect. Second network connection information may be embedded and transmitted in the audio stream during a second time period. A device attempting to connect using the first network connection information during the second time period may be unsuccessful.

Figure 1:
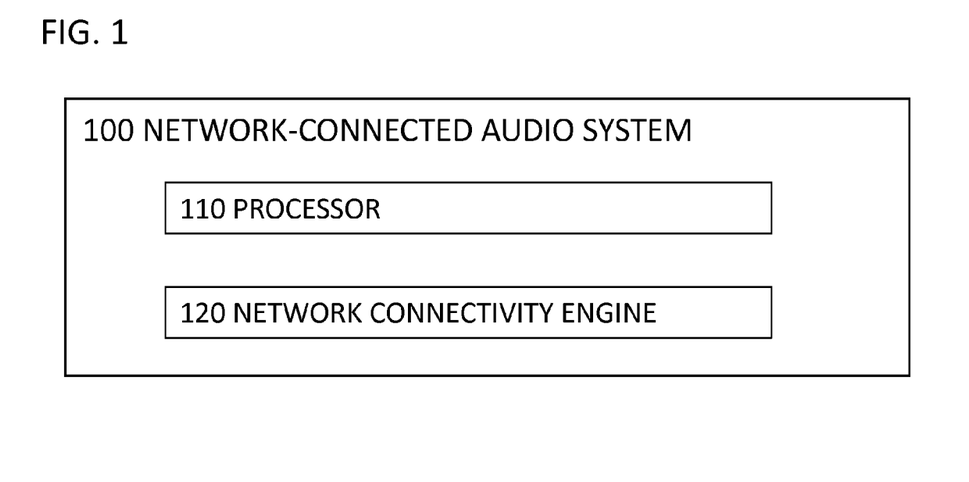
FIG. 1 is a depiction of an example network connected audio system for embedding information in an audio stream for connectivity.

Referring now to the drawings, FIG. 1 is a block diagram of an example network connected audio system 100 for embedding information in an audio stream for connectivity. The network connected audio system 100 may comprise a BLUETOOTH connected audio system, a WiFi connected audio system, or any other audio system suitable for executing the functionality described below. In the example depicted in FIG. 1, network connected audio system 100 includes a processor 110, a network connectivity engine 120, and/or other components for embedding information in an audio stream for connectivity.

As detailed below, network connected audio system 100 may include a hardware processor 110 and a set of engines (e.g., network connectivity engine 120, and/or other engines) for embedding information in an audio stream for connectivity. Each of the engines may generally represent any combination of hardware and programming. For example, the programming for the engines may be processor executable instructions stored on a non-transitory machine-readable storage medium and the hardware for the engines may include at least one processor of the network connected audio system 100 to execute those instructions. In addition or as an alternative, each engine may include one or more hardware devices including electronic circuitry for implementing the functionality described below.

The processor 110 of network connected audio system 100 may be one or more central processing units (CPUs), microprocessors, digital signal processors, and/or other hardware devices suitable for retrieval and execution of instructions stored in a machine-readable storage medium. The processor 110 may fetch, decode, and execute program instructions to enable connectivity to the network connected audio system 100, as described below. As an alternative or in addition to retrieving and executing instructions, the processor 110 may include one or more electronic circuits comprising a number of electronic components for performing the functionality of instructions stored in the machine-readable storage medium.

In one example, the instructions can be part of an installation package that can be executed by the processor 110 to implement the functionality described herein. In this case, the machine-readable storage medium may be a portable medium such as a CD, DVD, or flash drive or a memory maintained by a computing device from which the installation package can be downloaded and installed. In another example, the program instructions may be part of an application or applications already installed on network connected audio system 100.

The non-transitory machine-readable storage medium may be any hardware storage device for maintaining data accessible to network connected audio system 100. For example, the machine-readable storage medium may include one or more hard disk drives, solid state drives, tape drives, and/or any other storage devices. The storage devices may be located in network connected audio system 100 and/or in another device in communication with network connected audio system 100. For example, the machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions for embedding information in an audio stream for connectivity. As detailed below, the machine-readable storage medium may maintain and/or store the data and information described herein.

As mentioned above, network connected audio system 100 may also comprise a network connectivity engine 120.

The network connectivity engine 120 may embed network connection information in an audio stream that is to transmitted by the network connected audio system 100 to facilitate connectivity with the network connected audio system 100. For example, the network connectivity engine 120 may embed network connection information in an audio stream transmitted by the network connected audio system 100 by adding in a signal or digital data into the audio stream. The signal or digital data may interrupt the audio stream being transmitted by the network connected audio system or may be transmitted alongside other data (e.g., music or other audio) being transmitted. In some examples, the network connection information embedded in the audio stream via the signal or digital data may not be detectable by human ears.

The network connection information may comprise, for example, network identification information. The network identification information may comprise an IP address of the network connected audio system 100, an SSID associated with the network connected audio system 100, a network ID associated with the network on which the network connected audio system 100 is connected, and/or other connection information related to the network and/or the network connected audio system 100. In some examples, the network connection information may also comprise security information. The security information may comprise, for example, information related to a user name and password, encrypted information, and/or other security information that may be used to connect to the network connected audio system 100.

In some examples, the network connection information may begin with an indicator (e.g., a set of bits that indicates that the next set of information that is transmitted by the audio stream comprises the network connection information). In some examples, the indicator may also comprise information indicating a size of the network connection information. In other examples, the network connection information may also comprise an end indicator (e.g., a set of bits that indicates that the network connection information has been transmitted).

Responsive to embedding the network connection information in the audio stream, the network connectivity engine 120 may transmit the audio stream with the embedded network connection information. The network connectivity engine 120 may transmit the audio stream over air waves, such that the audio stream may be heard by other devices, users in the vicinity of the network connected audio system, over the Internet and/or other networks, and/or by other transmission methods.

In some examples, the network connection information may be changed at predetermined time intervals to ensure timely connection of devices and/or to allow the owner of the network connected audio system 100 to change the set of users/devices that may be able to connect to the network connected audio system 100.

For example, the network connection information may comprise a code that may be used to make sure that connection attempts to the network connected audio system are timely. For example, the network connectivity engine 120 may embed a first network connection information in the audio stream during a first time period and may embed a second network connection information in the audio stream during a second time period. The first network connection information may comprise a first code that is different from a second code in the second network connection information. A user/device attempting to connect to the network connected audio system 100 during the first time period may need to use the first network connection information with the first code in order to connect. To that end, a user/device attempting to connect to the network connected audio system 100 during the second time period would be unsuccessful if the user/device used the first network connection information with the first code. The user/device would need to use the second network connection information with the second code to connect to the network connected audio system during the second time period.

The first code and the second code may be randomly generated, may be pseudo-randomly generated while taking into account factors such as time or information about the network, and/or may be generated based on various factors related to time, the network, the network connected audio system 100, the audio stream, and/or other factors.

In some examples, the machine-readable storage medium of the network connected audio system 100 may store information related to the network connection information embedded in the audio stream and may store information related to connection request information that may correspond to the network connection information, where the connection request information comprises information that may be required in order to connect to the network connected audio system 100. For example, responsive to the network connected information comprising a code, the connection request information may comprise the code. Responsive to the network connection information comprising security information, the connection request information may comprise corresponding security check information (e.g., a private/public key combination, a password, etc.). Other types of network connection information and connection request information may be stored as well.

In some examples, the network connectivity engine 120 may include information related to the connection request information in the network connection information. For example, the network connection information may include information about the data that a device should send in order to be successfully connected to the network connected audio system 100. The data may comprise, for example, specific parts of the network connection information, an indication that the entire set of network connection information should be sent, data manipulations that should be done to the network connection information, information related to decrypting information included in the network connection information, and/or other information about the data to be sent by a device to successfully connect to the network connected audio system 100.

The network connectivity engine 120 may receive information from a first device indicating that it would like to connect to the network connected audio system (e.g., via near field communications, WiFi, Bluetooth, a wired connection, and/or other networks). The information may comprise the network connection information embedded in an audio stream transmitted by the network connected audio system 100. The information received from the first device may also comprise information related to the user to be connected to the network connected audio system 100.

The network connectivity engine 120 may determine whether to connect the first device to the network connected audio system 100 based on the received information. For example, the network connectivity engine 120 may compare the received information with the network connection information. Responsive to the received information matching the network connection information, the network connectivity engine 120 may connect the first device to the network connected audio system 100. In other examples in which the non-transitory machine-readable storage medium stores connection request information, the network connectivity engine 120 may compare the received information to connection request information stored in a non-transitory machine-readable storage medium associated with the network connected audio system 100. Responsive to the received information matching the connection request information, the network connectivity engine 120 may connect the first device to the network connected audio system 100.

Responsive to connecting the first device to the network connected audio system 100, the network connected audio system 100 may receive audio files from the first device and may play the audio files.

In some examples, the network connectivity engine 120 may receive requests from numerous devices to connect to the network connected audio system 100 and may determine, for each request, whether to connect the requesting device in a manner similar to determining whether to connect the first device as described above. For example, during a party in which the network connected audio system 100 is providing music, the network connectivity engine 120 may receive requests from multiple users/devices over a predetermined time period to connect to the network connected audio system 100. The network connectivity engine 120 may change the network connection information transmitted by the network connected audio system 100 after the predetermined time period has ended.

In some examples, the network connectivity engine 120 may change the network connection information to be embedded in the audio stream automatically at predetermined time intervals. The network connectivity engine 120 may, in addition or in lieu of the automatic change, also change the network connection information responsive to receiving an indication from an administrator of the network connected audio system 100 to change the network connection information. In some examples, the network connectivity engine 120 may require information (e.g., a username/password, key, and/or other authentication information) from the administrator proving that they have authorization to change the network connection information. In some examples, the network connectivity engine 120 may change the network connection information responsive to one or more conditions being met (e.g., a predetermined number of unsuccessful attempts, a predetermined amount of time passing since the network connection information was changed, a change in network information of the network connected audio system 100, and/or other conditions). The conditions may be stored in the non-transitory machine-readable storage medium associated with the network connected audio system 100, received from an administrator of the network connected audio system 100, and/or otherwise received.

Figure 2:
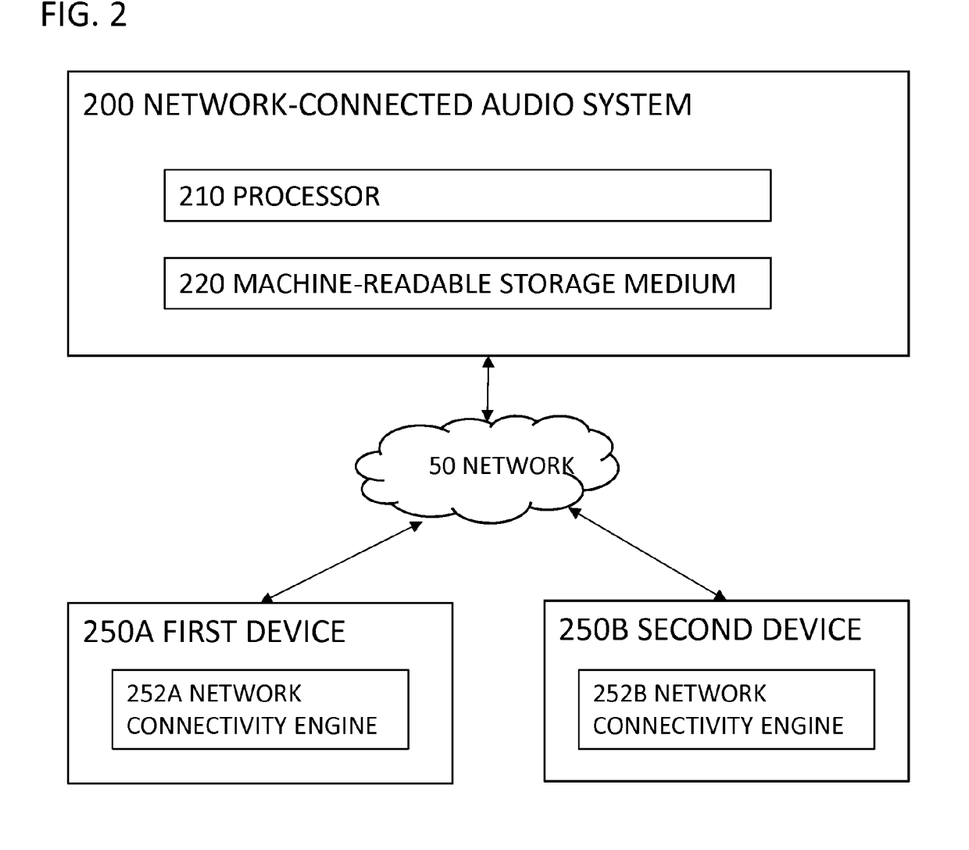
FIG. 2 is a depiction of an example system for embedding information in an audio stream for connectivity.

FIG. 2 depicts an example network connected audio system 200 that embeds information in an audio stream for connectivity. As with network connected audio system 100, network connected audio system 200 may comprise a BLUETOOTH connected audio system, WiFi connected audio system, or any other network connected audio system suitable for executing the functionality described below. Network connected audio system 200 may comprise a processor 210, a machine-readable storage medium 220, and/or other components. As with the processor of network connected audio system 100, processor 210 may be one or more CPUs, microprocessors, digital signal processor, and/or other hardware devices suitable for retrieval and execution of instructions. As with the storage medium of network connected audio system 100, the machine-readable storage medium 220 of network connected audio system 200 may be any hardware storage device for maintaining data accessible to network connected audio system 200 and may comprise information similar to that stored in the machine-readable storage medium of network connected audio system 100.

The processor 210 of network connected audio system 200 may execute computer readable instructions stored in the machine-readable storage medium 220 of network connected audio system 200. The processor 210 may execute the computer readable instructions to perform functionality the same as or similar to the functionality performed by the processor 110, the network connectivity engine 120, and/or other components of the network connected audio system 100.

For example, processor 210 of network connected audio system 200 may execute computer readable instructions stored in the machine-readable storage medium 220 to embed network connection information in the audio stream, transmit the audio stream with the embedded network connection information, receive first network connection information from a first device, connect the first device to the network connected audio system 200 responsive to receiving the first network connection information, receive second network connection information from a second device, connect the second device to the network connected audio system 200 responsive to receiving the second network connection information, receive information related to a first audio file from the first device, and play the first audio file.

Network connected audio system 200 may also be communicably coupled to one or more user devices (e.g. user devices 250a, 250b).

A user device 250a may comprise, for example, a laptop computing device, a desktop computing device, an all-inone computing device, a tablet computing device, a mobile phone, an electronic book reader, a network-enabled appliance such as a "Smart" television, a server, and/or other electronic device suitable for executing the functionality described below. An individual user device 250a may be coupled to network connected audio system 200 via a network 50. The network 50 may be any suitable network for facilitating communication between the device 250a and the audio system 200.

In the example depicted in FIG. 2, device 250a includes a network connectivity engine 252a, and/or other components.

As detailed below, device 250a may include a set of engines (e.g., network connectivity engine 252a, etc.). Each of the engines may generally represent any combination of hardware and programming. For example, the programming for the engines may be processor executable instructions stored on a non-transitory machine-readable storage medium 220 and the hardware for the engines may include at least one processor of the device 250a to execute those instructions. In addition or as an alternative, each engine may include one or more hardware devices including electronic circuitry for implementing the functionality described below. While functionality may be ascribed to a particular engine, one or more engines of the device 250a may perform that functionality.

The processor of device 250a may be one or more central processing units (CPUs), microprocessors, and/or other hardware devices suitable for retrieval and execution of instructions stored in a machine-readable storage medium. The processor may fetch, decode, and execute program instructions to perform the functionality described herein, as described below. As an alternative or in addition to retrieving and executing instructions, the processor may include one or more electronic circuits comprising a number of electronic components for performing the functionality of instructions stored in the machine-readable storage medium.

In one example, the instructions can be part of an installation package that can be executed by the processor to implement the functionality described herein. In this case, the machine-readable storage medium may be a portable medium such as a CD, DVD, or flash drive or a memory maintained by a computing device from which the installation package can be downloaded and installed. In another example, the program instructions may be part of an application or applications already installed on device 250a.

The machine-readable storage medium may be any hardware storage device for maintaining data accessible to device 250a. For example, the machine-readable storage medium may include one or more hard disk drives, solid state drives, tape drives, and/or any other storage devices. The storage devices may be located in device 250a and/or in another device in communication with device 250a. For example, the machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions. As detailed below, the machine-readable storage medium may maintain and/or store the data and information described herein.

The user device 250a may provide audio files and/or information related to audio files to be played by the network connected audio system 200, may provide information to connect the device 250a to the network 50 to facilitate connection with the audio system 200, may provide information to directly connect to the audio system 200, may provide information about the audio settings preferences of a user, and/or may otherwise interact with the audio system 200.

Network connectivity engine 252a may facilitate connection of the device to the network connected audio system 200 (e.g., as described above). The network connectivity engine 252a may receive the audio stream transmitted by the network connected audio system 200, may parse the audio stream for the network connection information, and may transmit information to the network connected audio system 200 in order to request connection to the network connected audio system 200.

The network connectivity engine 252a may parse the audio stream for the network connection information. For example, the network connectivity engine 252a may determine that the network connection information is being transmitted based on an indicator in the transmitted audio stream. In another example, the network connectivity engine 252a may determine which information in the audio stream does not match the intended audio stream (e.g., the music or other audio being played) and may determine that the non-matching information comprises the network connection information.

Responsive to determining the network connection information from the audio stream, the network connectivity engine 252a may determine information to send to the network connected audio system 200 to request connection. In some examples, the network connectivity engine 252a may send the network connection information back to the network connected audio system 200. In some examples, the network connection information may comprise information indicating what data the network connectivity engine 252a should send. In these examples, the network connectivity engine 252a may determine the data to be sent and may send that data to the network connected audio system 200.

Responsive to sending information to connect to the network connected audio system 200, the network connectivity engine 252a may receive a response from the network connected audio system 200 indicating whether connection was successful or not. Responsive to the connection being successful, the device 250a may send one or more audio files to be played by the network connected audio system 200.

In the example depicted in FIG. 2, each device 250A and 250B each have a respective network connectivity engine 252A, 252B that facilitates connection to the network connected audio system 200.

Figure 3:
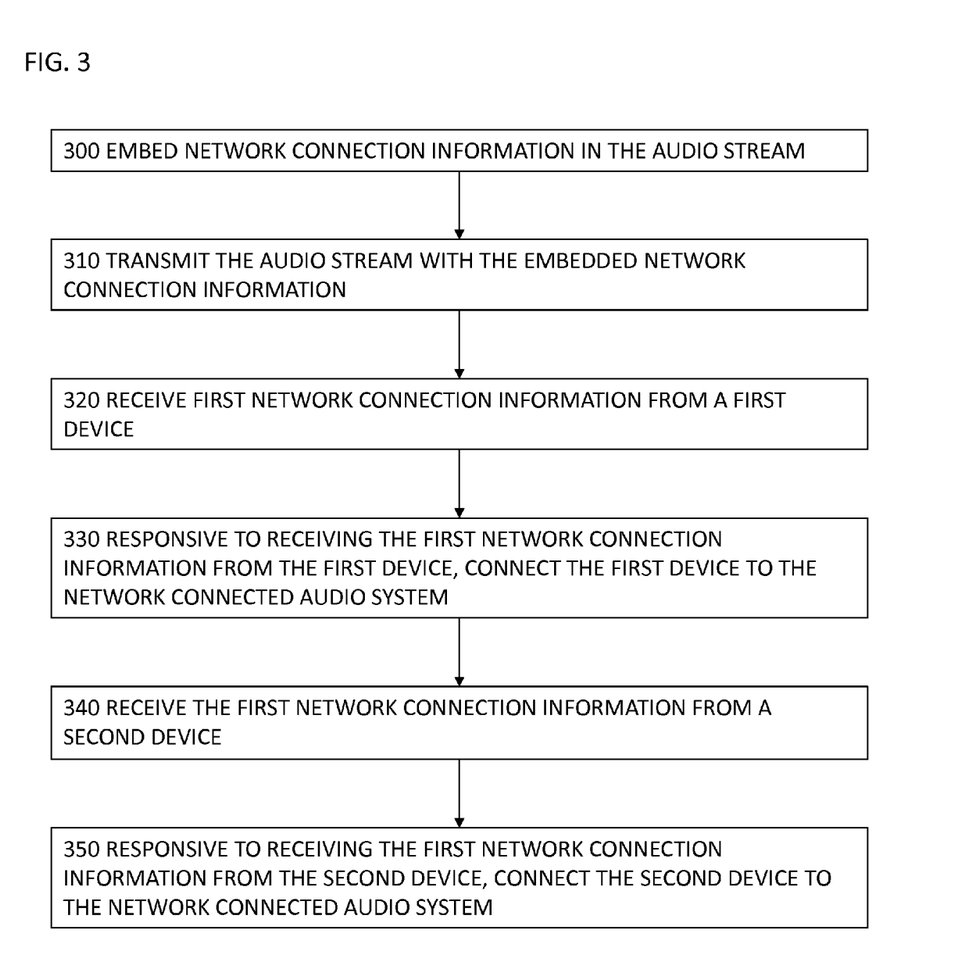
FIG. 3 is a depiction of an example method for embedding information in an audio stream for connectivity.

FIG. 3 is a flowchart of an example method for execution by a system for embedding information in an audio stream for connectivity.

Although execution of the method described below is with reference to network connected audio systems 100 and 200 of FIGS. 1 and 2, other suitable devices for execution of this method will be apparent to those of skill in the art. The method described in FIG. 3 and other figures may be implemented in the form of executable instructions stored on a machine-readable storage medium, by one or more engines described herein, and/or in the form of electronic circuitry.

In an operation 300, network connection information may be embedded in an audio stream played by the network connected audio system. For example, the network connected audio system 100 (and/or the processor 110, network connectivity engine 120, or other resource of the network connected audio system 100) may embed the network connection information in the audio stream. The network connected audio system 100 may embed the network connection information in the audio stream in a manner similar or the same as that described above in relation to the execution of the processor 110, network connectivity engine 120, or other resource of the network connected audio system 100.

In an operation 310, the network connected audio system may transmit the audio stream with the embedded network connection information. For example, the network connected audio system 100 (and/or the processor 110, network connectivity engine 120, or other resource of the network connected audio system 100) may transmit the audio stream with the embedded network connection information. The network connected audio system 100 may transmit the audio stream with the embedded network connection information in a manner similar or the same as that described above in relation to the execution of the processor 110, network connectivity engine 120, or other resource of the network connected audio system 100.

In an operation 320, the network connected audio system may receive the first network connection information from the first device. For example, the network connected audio system 100 (and/or the processor 110, network connectivity engine 120, or other resource of the network connected audio system 100) may receive the first network connection information from the first device. The network connected audio system 100 may receive the first network connection information from the first device in a manner similar or the same as that described above in relation to the execution of the processor 110, network connectivity engine 120, or other resource of the network connected audio system 100.

In an operation 330, the network connected audio system may connect the first device responsive to the network connected audio system receiving the first network connection information from the first device. For example, the network connected audio system 100 (and/or the processor 110, network connectivity engine 120, or other resource of the network connected audio system 100) may connect the first device. The network connected audio system 100 may connect the first device in a manner similar or the same as that described above in relation to the execution of the processor 110, network connectivity engine 120, or other resource of the network connected audio system 100.

In an operation 340, the network connected audio system may receive the first network connection information from the second device. For example, the network connected audio system 100 (and/or the processor 110, network connectivity engine 120, or other resource of the network connected audio system 100) may receive the first network connection information from the second device. The network connected audio system 100 may receive the first network connection information from the second device in a manner similar or the same as that described above in relation to the execution of the processor 110, network connectivity engine 120, or other resource of the network connected audio system 100.

In an operation 350, the network connected audio system may connect the second device responsive to the network connected audio system receiving the first network connection information from the second device. For example, the network connected audio system 100 (and/or the processor 110, network connectivity engine 120, or other resource of the network connected audio system 100) may connect the second device. The network connected audio system 100 may connect the second device in a manner similar or the same as that described above in relation to the execution of the processor 110, network connectivity engine 120, or other resource of the network connected audio system 100.

The foregoing disclosure describes a number of examples of an audio system for embedding information in an audio stream for connectivity. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

I claim:
1. An audio system comprising:
a network connectivity engine, comprising a processor, to:
    embed a first network connection information in an audio stream at predetermined intervals of a first time period;
    transmit the audio stream with the embedded first network connection information;
    embed a second network connection information in the audio stream at predetermined intervals of a second time period after the first time period;
    transmit the audio stream with the embedded first network connection information and the embedded second network connection information, wherein the network connection information comprises:
        a rolling code that changes over time; and
        an indication about data a device should send in order to connect to the audio system;
    receive first network connection information from a first device;
    compare the first network connection information from the first device against the network connection information embedded in the audio stream to determine a match;
    responsive to a determination that the received first network connection information from the first device matches the network connection information embedded in the audio stream, connect the first device to the audio system;
    receive first network connection information from a second device;
    compare the first network connection information from the second device against the network connection information embedded in the audio stream to determine a match; and
    responsive to a determination that the first received network connection information from the second device matches the network connection information embedded in the audio stream, connect the second device to the audio system.

2. The audio system of claim 1, wherein the network connection information comprises network identification information of the audio system.

3. The audio system of claim 2, wherein the network connection information further comprises security information related to the network and error correction information related to the network identification information and the security information.

4. The audio system of claim 1, wherein the first network connection information comprises network identification information of the audio system and a first code, and the second network connection information comprises the network identification information of the audio system and a second code.

5. The audio system of claim 4, wherein the first code and the second code are randomly generated.

6. An audio system comprising:
a processor implementing machine-readable instructions to cause the audio system to:
embed a first network connection information in an audio stream at predetermined intervals of a first time period;
transmit the audio stream with the embedded first network connection information;
embed a second network connection information in the audio stream at predetermined intervals of a second time period after the first time period;
transmit the audio stream with the embedded first network information and the embedded second network connection information, wherein the network connection information comprises:
a rolling code that changes over time; and
an indication about data a device should send in order to connect to the audio system;
receive first network connection information from a first device;
compare received first network connection information from the first device against the network connection information embedded in the audio stream to determine a match;
responsive to a determination that the first network connection information from the first device matches the network connection information embedded in the audio stream, connect the first device to the audio system;
receive first network connection information from a second device;
compare received first network connection information from the second device against the network connection information embedded in the audio stream to determine a match; and
responsive to a determination that the first network connection information from the second device matches the network connection information embedded in the audio stream, connect the second device to the audio system;
receive information related to a first audio file from the first device; and
play the first audio file.

7. The audio system of claim 6, wherein the first network connection information comprises network identification information of the audio system and a first code, and the second network connection information comprises the network identification information of the audio system and a second code.

8. The audio system of claim 6, wherein the processor implements machine-readable instructions that cause the audio system to:
receive the network connection information from a plurality of devices;
connect the plurality of devices to the audio system responsive to receiving the network connection information from each device of the plurality of devices.

9. The audio system of claim 8, wherein the processor implements machine-readable instructions to:
responsive to connecting the plurality of devices, receive a set of audio files to play via the audio system from the plurality of devices;
receive instructions to change network connection information for the audio system; and
disconnect the plurality of devices such that the plurality of devices are no longer able to communicate with the audio system.

10. A method comprising:
embedding, by an audio system, a first network connection information in an audio stream at predetermined intervals of a first time period;
transmitting the audio stream with the embedded first network connection information;
embedding, by the audio system, a second network connection information in the audio stream at predetermined intervals of a second time period after the first time period;
transmitting the audio stream with the embedded first network information and the embedded second network connection information, wherein the network connection information comprises:
a rolling code that changes over time; and
an indication about data a device should send in order to connect to the network connected audio system;
receiving, by the audio system, first network connection information from a first device;
comparing the first network connection information from the first device against the network connection information embedded in the audio stream to determine a match;
responsive to a determination that the received first network connection information from the first device matches the network connection information embedded in the audio stream, connecting, by the audio system, the first device to the audio system;
receiving, by the network connected audio system, the first network connection information from a second device;
comparing the first network connection information from the second device against the network connection information embedded in the audio stream to determine a match;
responsive to a determination that the received first network connection information from the second device matches the network connection information embedded in the audio stream, connecting, by the audio system, the second device to the audio system.

11. The method of claim 10, wherein the network connection information comprises network identification information of the audio system and device identification information related to a network to which the audio system is connected.

12. The method of claim 10, wherein the first network connection information comprises network identification information of the audio system and a first code, and the second network connection information comprises the network identification information of the audio system and a second code.

13. The audio system of claim 1, wherein data in which the network connection information is embedded interrupts the audio stream.

14. The audio system of claim 1, wherein data in which the network connection information is embedded is transmitted alongside the audio stream.

15. The audio system of claim 1, wherein the network connection information comprises:
   a first indicator to indicate that a set of transmitted information comprises the network connection information; and
   a second indicator to indicates a size of the network connection information.

16. The audio system of claim 3, wherein the security information comprises a user name and password to connect to the network connected audio system.

17. The method of claim 10, further comprising changing the network connection information to be embedded in the audio stream responsive to a connectivity condition being met.

18. The audio system of claim 1, wherein the audio system is a network-connected audio system.

19. The audio system of claim 6, wherein the audio system is a network-connected audio system.

20. The method of claim 10, wherein the audio system is a network-connected audio system.

* * * * *